(12) United States Patent
Li et al.

(10) Patent No.: US 8,509,802 B2
(45) Date of Patent: Aug. 13, 2013

(54) METHODS AND APPARATUS SUPPORTING LOAD BALANCING IN A WIRELESS COMMUNICATIONS SYSTEM

(75) Inventors: Junyi Li, Chester, NJ (US); Saurabh Tavildar, Jersey City, NJ (US); Aleksandar Jovicic, Jersey City, NJ (US); Hongseok Kim, Chatham, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 12/787,449

(22) Filed: May 26, 2010

(65) Prior Publication Data
US 2011/0292884 A1 Dec. 1, 2011

(51) Int. Cl.
*H04W 72/00* (2009.01)

(52) U.S. Cl.
USPC ........ 455/453; 455/434; 455/450; 455/67.11; 455/226.1

(58) Field of Classification Search
USPC .................. 455/453, 450, 452.1, 452.2, 434, 455/226.1, 67.11
See application file for complete search history.

(56) References Cited

U.S. PATENT DOCUMENTS

| 2003/0100308 | A1 | 5/2003 | Rusch | |
| 2011/0032821 | A1* | 2/2011 | Morrill et al. | 370/230 |
| 2011/0080868 | A1* | 4/2011 | Krishnaswamy et al. | 370/328 |

FOREIGN PATENT DOCUMENTS

| EP | 1589781 | 10/2005 |
| WO | 9829975 A2 | 7/1998 |
| WO | 2006026679 A1 | 3/2006 |

OTHER PUBLICATIONS

Hano Wang, et al., "Advanced Sensing Techniques of Energy Detection in Cognitive Radios (Invited Paper)", Journal of Communications and Networks, Korean Institute of Communication Sciences, Seoul, KR, vol. 12, No. 1, Feb. 1, 2010, pp. 19-29, XP011334708, ISSN: 1229-2370, DOI: 10.1109/JCN.2010.5710555 the whole document.
International Search Report and Written Opinion—PCT/US2011/038068—ISA/EPO—Sep. 1, 2011.

* cited by examiner

*Primary Examiner* — Temica M Beamer
(74) *Attorney, Agent, or Firm* — Paul S. Holdaway

(57) ABSTRACT

Methods and apparatus supporting load balancing in a wireless communications system implementing decentralized control are described. Different channels, e.g., unused TV channels, are available in different locations for use for communications. Various communications technologies, e.g., WiFi, 3G Blue-Tooth, etc., may be supported by a communications device and may be allowed to be used on the available channels. A wireless communications device evaluates its current local environment, e.g., estimating potential rates that it may use and/or estimating latency, for each of a plurality of available alternative channel/technology combinations. The wireless communications device selects a channel and technology combination to use as a function of its estimates. The wireless communications device uses its selected channel and technology combination for communications, e.g., for peer to peer communications including direct peer to peer traffic signaling as part of a local peer to peer network.

30 Claims, 11 Drawing Sheets

METHODS AND APPARATUS SUPPORTING LOAD BALANCING IN A WIRELESS COMMUNICATIONS SYSTEM

FIELD

Various embodiments relate to wireless communications, and more particularly, to methods and apparatus related to load balancing in a wireless communications system.

BACKGROUND

Recently, the FCC has allowed the use of unused TV spectrum, sometimes referred to as white space, with rules for accessing the spectrum. There are potentially multiple channels available for use at a particular location, and potentially multiple technologies that can be use with those channels. In a system with centralized control, the controller node can effectively balance the loads throughout the system among the alternative available channel/technology possible combinations. However, with a centralized approach, a significant amount of overhead signaling typically needs to be communicated frequently to the central control node to efficiently manage and load balance the available resources, e.g., current channel conditions at the nodes, current resource needs for the nodes, latency considerations, etc. This overhead signaling may consume a significant portion of the available air link resources which might otherwise be used for carrying traffic. In addition, it may be difficult for some wireless communications devices to communicate with the centralized control node, e.g., a wireless communications device may be located far away from an access point and may have to transmit at high power to communicate with the access point, causing a high level of interference to other nodes. Unfortunately, in a system lacking centralized control, it is difficult to balance traffic across the different channel/technology combinations that may be available.

Based on the above discussion, it should be appreciated that there is a need for methods and apparatus which would allow decentralized decision making with regard to channel/technology usage decisions so that a large amount of overhead signaling does not have to be communicated to a central control node.

SUMMARY

Methods and apparatus related to load balancing in a wireless communications system are described. Various exemplary methods and apparatus are well suited for use in wireless communications systems in which decisions are made in a decentralized manner, e.g., a wireless communication system including ad-hoc peer to peer wireless networks implementing decentralized control with regard to air link resource usage and/or technology usage decisions.

In some embodiments, different channels are available in different locations. For example, the channels may be unused TV spectrum channels, sometimes referred to as white space, which are allowed to be used for communications by local communications networks, e.g., by local peer to peer communications networks. Various communications technologies, e.g., WiFi, 3G, Blue-Tooth, etc., may be supported by a communications device and may be allowed to be used on the available channels. A wireless communications device evaluates its current local environment, e.g., estimating potential rates that it may use and/or estimating latency, for each of a plurality of available alternative channel/technology combinations. The wireless communications device selects a channel and technology combination to use as a function of its estimates and/or as a function of estimates from another communications device, e.g., a peer device. The wireless communications device uses its selected channel and technology combination for communications, e.g., for peer to peer communications including direct peer to peer traffic signaling.

In some embodiments an exemplary method of operating a first wireless communications device comprises: generating N×M rate estimates, each one of the N×M rate estimates corresponding to a different channel and technology combination, N being a positive integer corresponding to a number of available channels, M being a positive integer corresponding to a number of supported technologies; and selecting a channel and technology combination based on the N×M rate estimates. In some such embodiments, the exemplary method further comprises using the selected channel and technology combination for communication.

An exemplary first wireless communications device, in accordance with some embodiments, comprises: at least one processor configured to: generate N×M rate estimates, each one of the N×M rate estimates corresponding to a different channel and technology combination, N being a positive integer corresponding to a number of available channels, M being a positive integer corresponding to a number of supported technologies; select a channel and technology combination based on the N×M rate estimates; and use the selected channel and technology combination for communication. The exemplary first wireless communications device further comprises memory coupled to said at least one processor.

In some embodiments an exemplary method of operating a first wireless communications device comprises: generating N×M latency estimates, each one of the N×M latency estimates corresponding to a different channel and technology combination, N being a positive integer corresponding to a number of available channels, M being a positive integer corresponding to a number of supported technologies; and selecting a channel and technology combination based on the N×M latency estimates. In some such embodiments, the exemplary method further comprises using the selected channel and technology combination for communication.

An exemplary first wireless communications device, in accordance with some embodiments, comprises: at least one processor configured to: generate N×M latency estimates, each one of the N×M latency estimates corresponding to a different channel and technology combination, N being a positive integer corresponding to a number of available channels, M being a positive integer corresponding to a number of supported technologies; select a channel and technology combination based on the N×M latency estimates; and use the selected channel and technology combination for communication. The exemplary first wireless communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
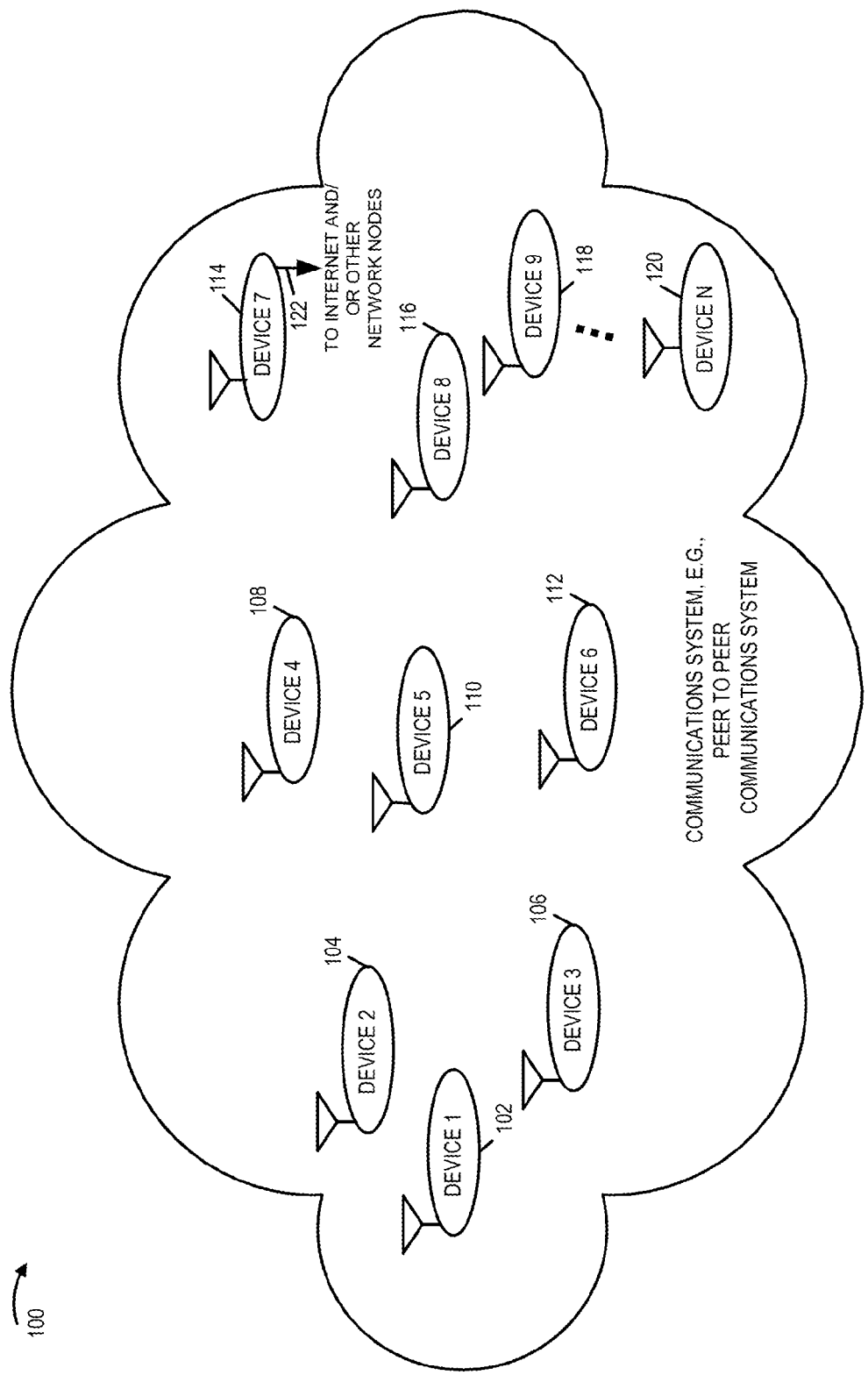
FIG. 1 is a drawing of an exemplary wireless communications system, e.g., peer to peer wireless communications system, in accordance with an exemplary embodiment.

FIG. 1 is a drawing of an exemplary wireless communication system 100, e.g., a peer to peer communications system in accordance with an exemplary embodiment. Exemplary wireless communications system 100 includes a plurality of wireless communications devices (device 1 102, device 2 104, device 3 106, device 4 108, device 5 110, device 6 112, device 7 114, device 8 116, device 9 118, . . . , device N 120. Some of the wireless communications devices in system 100, e.g., device 7 114, include an interface 122, to the Internet and/or other network nodes. Some of the wireless communications devices in system 100, e.g., device 1 102, device 2 104, device 3 106, device 4 108, device 5 110, device 6 112, device 8 116, device 9 118 and device N 120, are mobile wireless terminals, e.g., handheld mobile devices.

The wireless communications devices (102, 104, 106, 108, 110, 112, 114, 116, 118, . . . , 120) of system 100 participate in local peer to peer networks in which decisions are made in a decentralized manner. At different locations different channels, e.g., different unused TV channels, are available for use for localized networks, e.g., for local peer to peer communications networks. The wireless communications devices support a plurality of different technologies. At a particular location there may be, and sometimes are, a plurality of alternative channel/technology combinations which are available for a wireless communications device to use. A wireless communications devices estimates rate and/or latency corresponding to a plurality of channel/technology combinations and decides, e.g., selects, a channel and technology combination to use as a function of its estimates.

Figure 2:
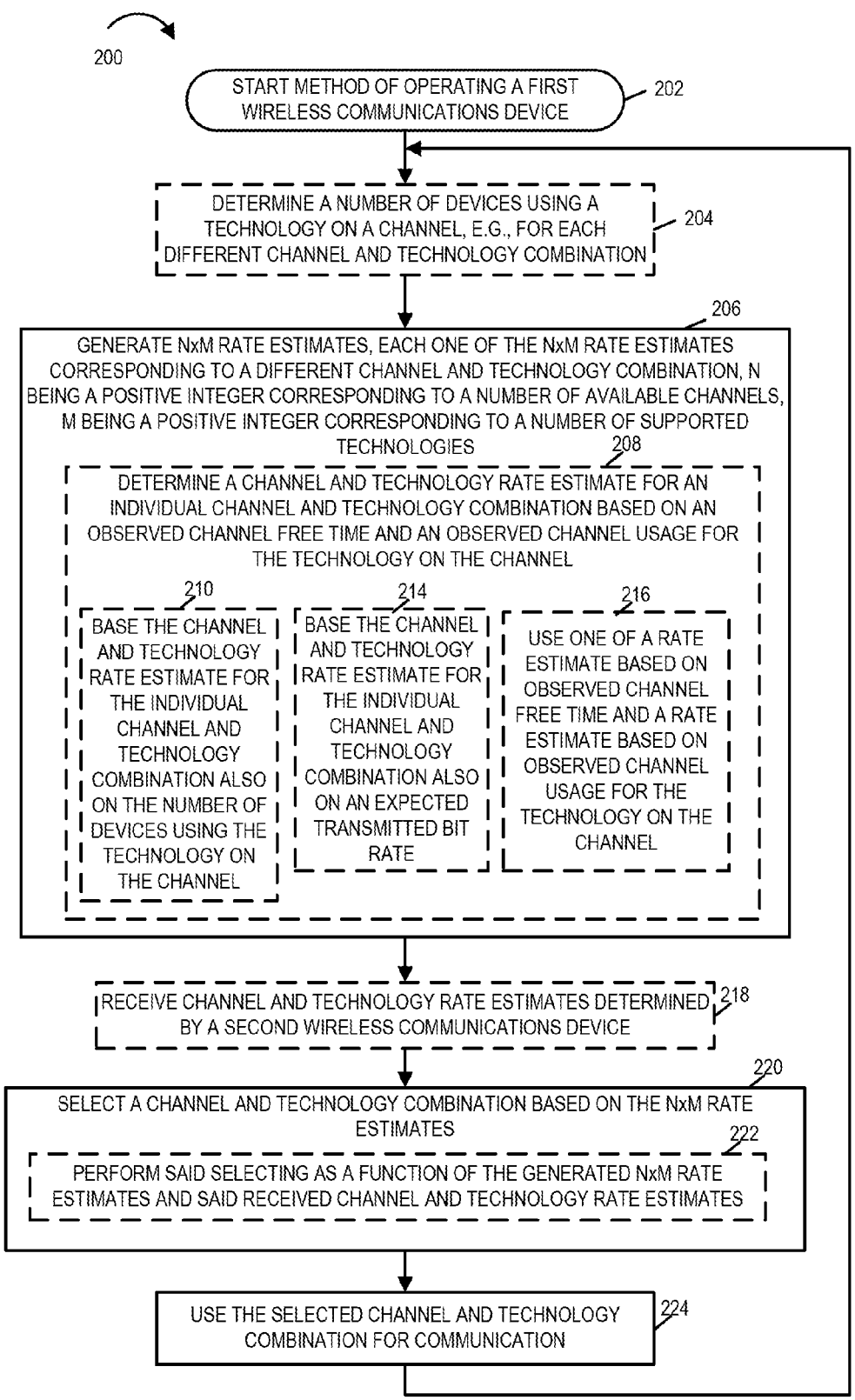
FIG. 2 is a flowchart of an exemplary method of operating a wireless communications device in accordance with an exemplary embodiment.

FIG. 2 is a flowchart 200 of an exemplary method of operating a first wireless communications device in accordance with an exemplary embodiment. The first communications device is, e.g., one of the wireless communications devices of system 100 of FIG. 1. Operation starts in step 202, where the first wireless communications device is powered on and initialized. Operation proceeds from step 202 to step 204.

In step 204 the first communications device determines a number of devices using a technology on a channel, e.g., for each different channel and technology combination. In some embodiments, the determined number of devices using a technology on a channel is based on observed signals. Operation proceeds from step 204 to step 206.

In step 206 the first wireless communications device generates N×M rate estimates, each one of the N×M rate estimates corresponding to a different channel and technology combination, N being a positive integer corresponding to a number of available channels and M being a positive integer corresponding to a number of supported technologies. In some embodiments step 206 includes step 208. In step 208 the first wireless communications device determines a channel and technology rate estimate for an individual channel and technology combination based on an observed channel free time and an observed channel usage for the technology on the channel. In various embodiments, step 208 is performed multiple times, e.g. one iteration for each channel technology combination.

In some embodiments, step 208 includes one or more or all of steps 210, 214 and 216. In step 210 the first wireless communications device bases the channel and technology rate estimate for the individual channel and technology combination also on the number of devices using the technology on the channel. Thus in some embodiments, the determined channel and technology rate estimate of step 208 is also based on the number of devices using the technology on the channel, e.g., obtained from step 204. In step 214 the first wireless communications device bases the channel and technology rate estimate for the individual channel and technology combination also on an expected transmitted bit rate. Thus, in some embodiments, the channel and technology rate estimate determined in step 208 is also a function of an expected transmitted bit rate. In some embodiments, the expected transmitted bit rate is a peak rate, e.g., a predetermined peak bit rate corresponding to a particular technology type. In some embodiments, the expected transmitted bit rate is a predicated bit rate based on channel conditions to a peer device and/or a detected interference level. In step 216 the first wireless communications device uses one of a rate based on observed channel free time and a rate based on observed channel usage for the technology on the channel. In some embodiments, in step 216 using one of a rate based on observed channel free time and a rate based on observed channel usage for the technology on the channel includes selecting one of a rate based on observed channel free time and a rate based on observed channel usage for the technology on the channel. In some embodiments, in step 216, the first wireless communications device selects the maximum of the rate estimate based on observed channel free time and the rate estimate based on observed channel usage. Operation proceeds from step 206 to step 218.

In step 218 the first wireless communications device receives channel and technology rate estimates determined by a second wireless communications device. Operation proceeds from step 218 to step 220. In step 220 the first wireless communications device selects a channel and technology combination based on the N×M rate estimates from step 206. In some embodiments, step 220 may, and sometimes does, include step 222 in which the first wireless communications device performs said selecting as a function of the generated N×M rate estimates from step 206 and said received channel and technology rate estimates from step 218. Operation proceeds from step 220 to step 224.

In step 224 the first wireless communications device uses the selected channel and technology combination for communication, e.g., for peer to peer communications including direct peer to peer traffic signals. Operation proceeds from step 224 to the input of step 204.

Steps 204, 208, 210, 214, 216, 218 and 222 are optional steps, included in some embodiments and omitted in other embodiments. The exemplary flow of flowchart 200 has been described for an embodiment in which each of the steps are included. In an embodiment, where an optional step is omitted the optional step is bypassed in the operation flow.

Figure 8:
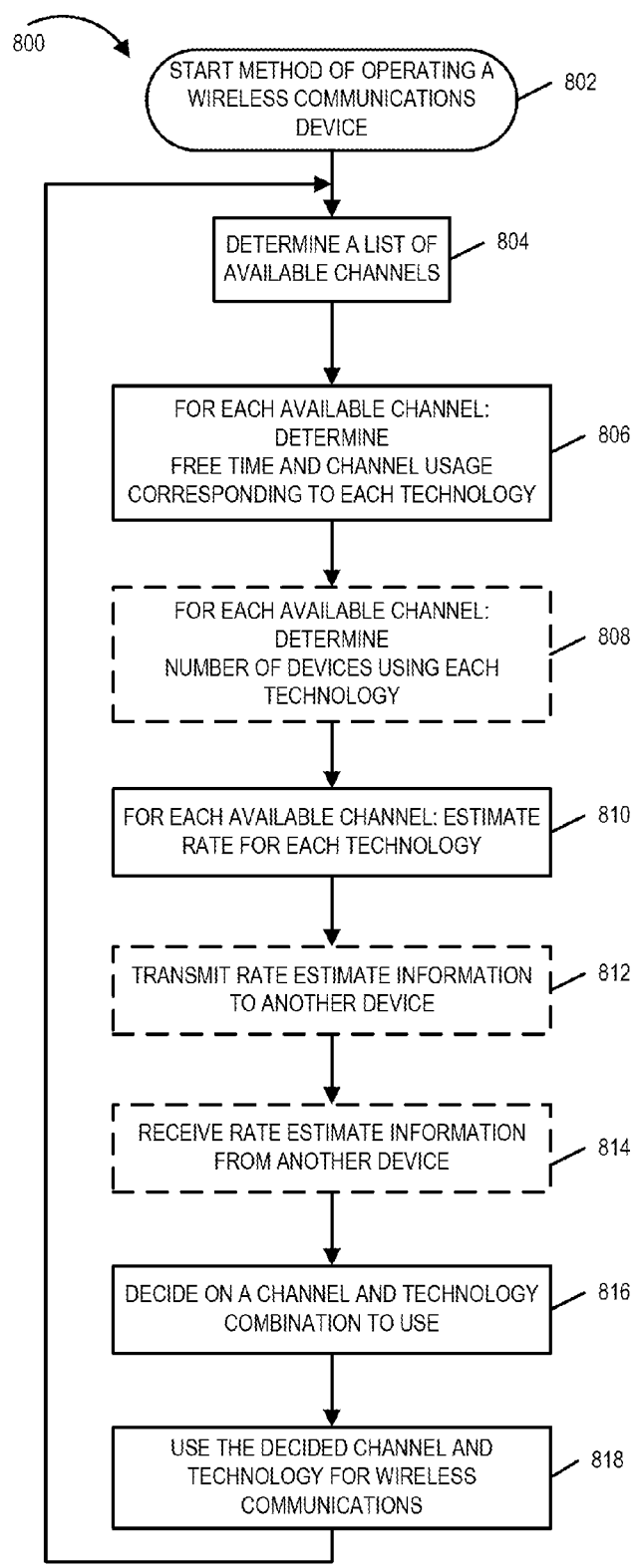
FIG. 8 is a flowchart of an exemplary method of operating a wireless communications device in accordance with various exemplary embodiments.

In some embodiments, the N×M rate estimates are determined in accordance with methods and/or formulas described with respect to FIG. 8.

Figure 3:
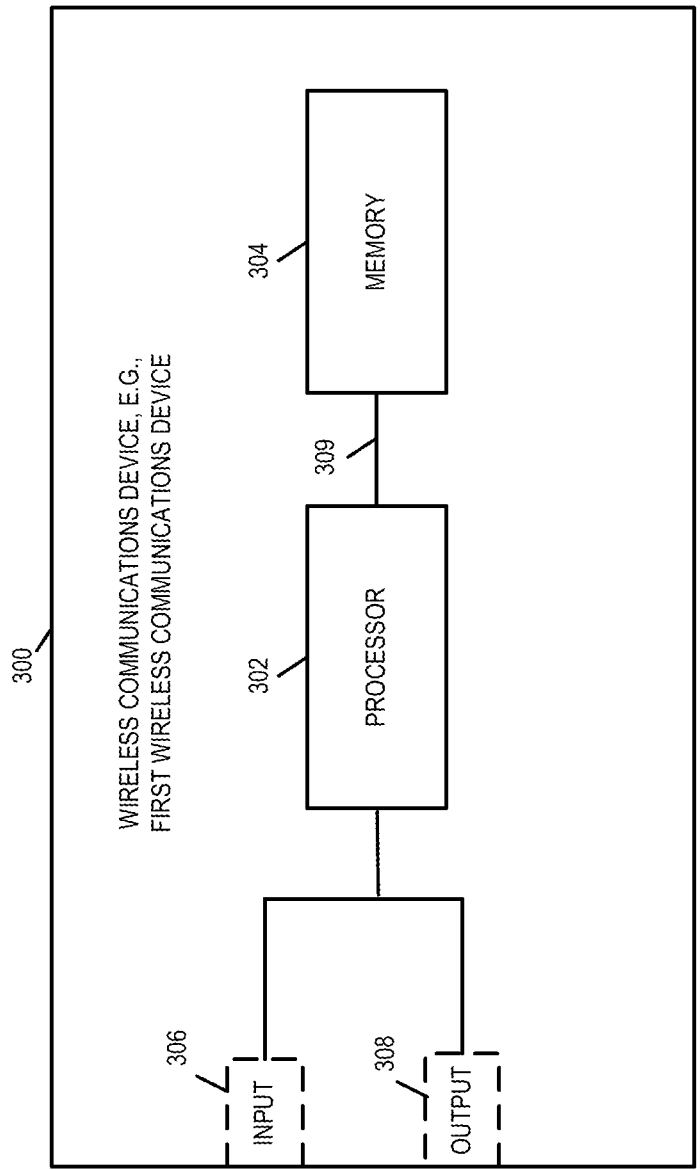
FIG. 3 is an exemplary wireless communications device in accordance with an exemplary embodiment.

FIG. 3 is a drawing of an exemplary wireless communications device 300, e.g., a first communications device, in accordance with an exemplary embodiment. Exemplary wireless communications device 300 is, e.g., one of the wireless communications devices of FIG. 1. Exemplary first wireless communications device 300 may, and sometimes does, implement a method in accordance with flowchart 200 of FIG. 2.

Wireless communications device 300 includes a processor 302 and memory 304 coupled together via a bus 309 over which the various elements (302, 304) may interchange data and information. Wireless communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to generate N×M rate estimates, each one of the N×M rate estimates corresponding to a different channel and technology combination, N being a positive integer corresponding to a number of available channels, M being a positive integer corresponding to a number of supported technologies and select a channel and technology combination based on the N×M rate estimates. Processor 302 is further configured to use the selected channel and technology combination for communication.

In some embodiments, processor 302 is configured to determine a channel and technology rate estimate for an individual channel and technology combination based on observed channel free time and an observed channel usage for the technology on the channel, as part of being configured to generate N×M rate estimates. In some such embodiments, processor 302 is configured to base the channel and technology rate estimate for the individual channel and technology combination on an expected transmitted bit rate, as part of being configured to determine a channel and technology rate estimate. In some embodiments, the expected transmitted bit rate is a peak rate corresponding to the technology, e.g., a predetermined peak rate corresponding to the technology. Different technologies may, and in some embodiments do, have different predetermined peak rates. In some embodiments, the expected transmitted bit rate is a predicated bit rate based on channel conditions to a peer device and/or a detected interference level. For example, the wireless communications device may measure an average interference level on a channel and predict an expected transmitted bit rate based on channel loss. In some such embodiments, as part of determining an expected transmitted bit rate the wireless communication device estimates SNR.

In various embodiments, processor 302 is configured to determine a number of devices using the technology on the channel and base the channel and technology rate estimate for the individual channel and technology combination on the number of devices using the technology on the channel, as part of being configured to determine a channel and technology rate estimate. In some embodiments, processor 302 is configured determine the number of devices using a technology on channel based on observed signals.

In some embodiments, processor 302 is configured to base the channel and technology rate estimate for the individual channel and technology combination also on an expected transmitted bit rate, as part of being configured to determine a channel and technology rate estimate.

In some embodiments, processor 302 is configured to use one of a rate estimate based on observed channel free time and a rate estimate based on observed channel usage for the technology on the channel, as part of being configured to determine a channel and technology rate estimate. In some embodiments, processor 302 is configured to select one of a rate estimate based on observed channel free time and a rate estimate based on observed channel usage for the technology on the channel, as part of being configured to use one of a rate estimate based on observed channel free time and a rate estimate based on observed channel usage for the technology on the channel. In some such embodiments, processor 302 is configured to select the maximum one of the rate estimate based on observed channel free time and the rate estimate based on channel usage.

In various embodiments, processor 302 is configured to: receive channel and technology rate estimates determined by a second wireless communications device, and processor 302 is further configured to perform said selecting as a function of the generated N×M rate estimates and said received channel and technology rate estimates, as part of being configured to select a channel and technology combination.

Figure 4:
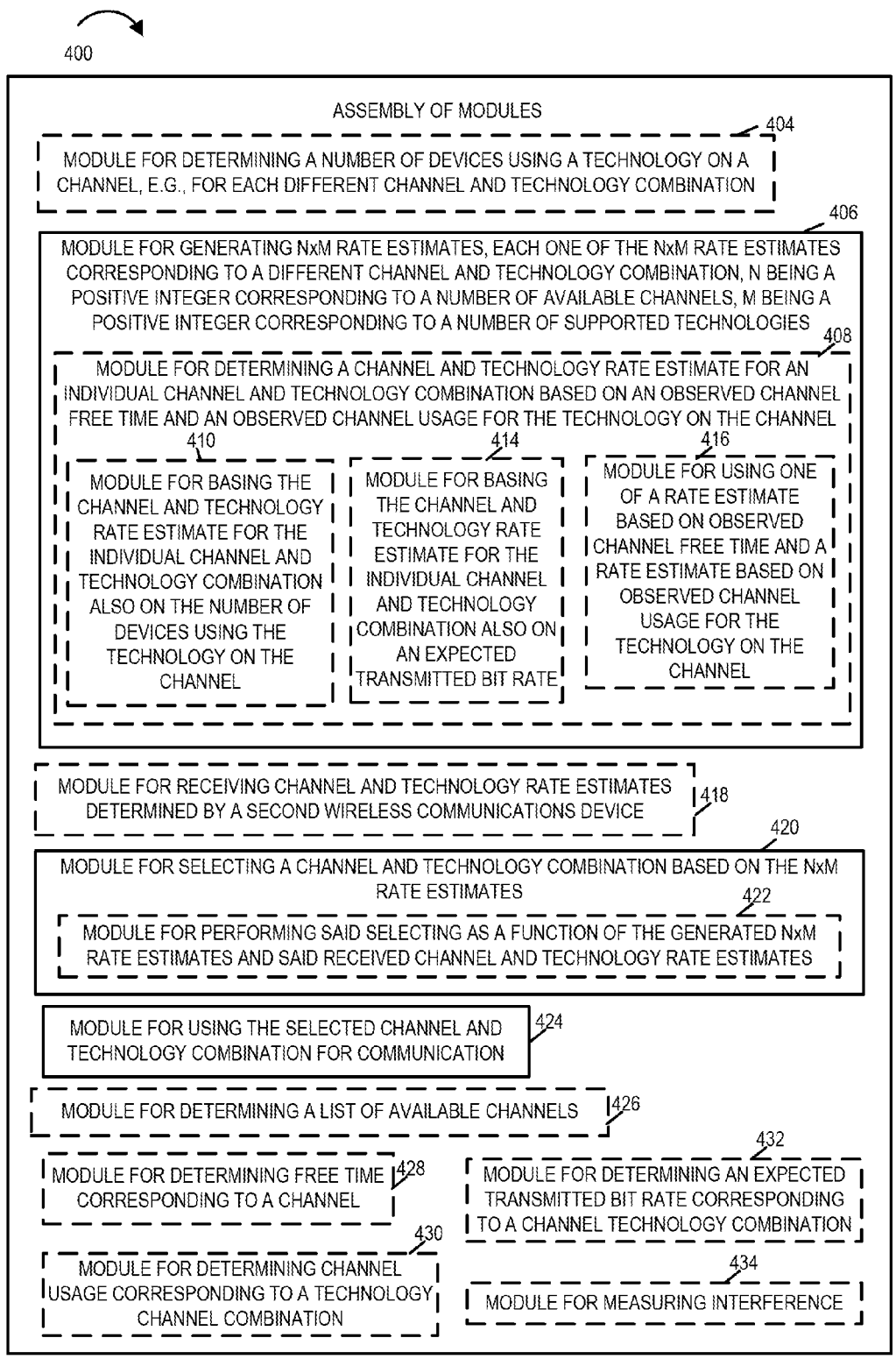
FIG. 4 is an assembly of modules which may be used in the exemplary wireless communications device of FIG. 3.

FIG. 4 is an assembly of modules 400 which can, and in some embodiments is, used in the wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the wireless communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless terminal 300 or elements therein such as the processor 302, to perform the functions of the corresponding steps illustrated and/or described in the method of flowchart 200 of FIG. 2.

Assembly of modules 400 includes a module 406 for generating N×M rate estimates, each one of the N×M rate estimates corresponding to a different channel and technology combination, N being a positive integer corresponding to a number of available channels, M being a positive integer corresponding to a number of supported technologies, a module 420 for selecting a channel and technology combination based on the N×M rate estimates, and a module 424 for using the selected channel and technology combination for communication. In some embodiments, assembly of modules 400 further includes one or more of: a module 404 for determining a number of devices using a technology on a channel, e.g., for each different channel and technology combination, and a module 418 for receiving channel and technology rate estimates determined by a second wireless communications device. In some embodiments, module 404 for determining the number of devices using a technology on a channel bases its determination on observed signals.

In some embodiments, module 406 for generating N×M rate estimates includes a module 408 for determining a channel and technology rate estimate for an individual channel and technology combination based on an observed channel free time and an observed channel usage for the technology on the channel. In various embodiments, module 408 includes one or more or all of: a module 410 for basing the channel and technology rate estimate for the individual channel and technology combination also on the number of devices using the technology on the channel, a module 414 for basing the channel and technology rate estimate for the individual channel and technology combination also on an expected transmitted bit rate, and a module 416 for using one of a rate estimate based on observed channel free time and a rate estimate based on observed channel usage for the technology on the channel. In some embodiments, module 416 selects one of a rate estimate based on observed channel free time and a rate estimate based on observed channel usage for the technology on the channel. In some embodiments including module 416, module 416 selects the maximum one of the rate estimate based on observed channel free time and the rate estimate based on observed channel usage. In some embodiments, e.g., some embodiments, including module 418, the module 420 for selecting includes a module 422 for performing said selecting as a function of the generated N×M rate estimates and said received channel and technology rate estimates.

In some embodiments assembly of module 400 further includes one or more or all of: a module 426 for determining a list of available channels, e.g., a list of N available channels, a module 428 for determining free time corresponding to a channel, a module 430 for determining channel usage corresponding to a channel technology combination, a module 432 for determining an expected transmitted bit rate corresponding to a channel technology combination, and a module 434 for measuring interference.

Figure 5:
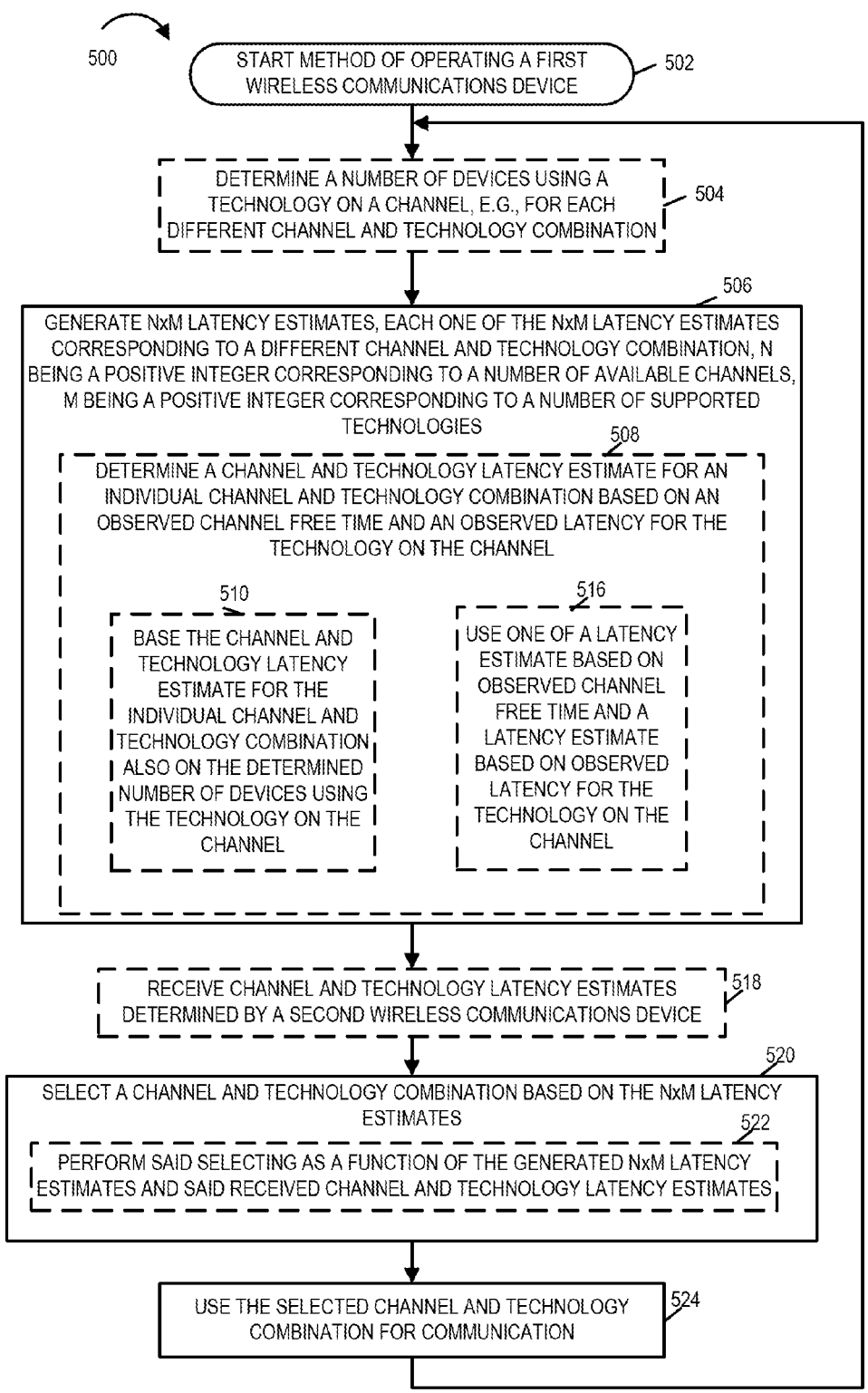
FIG. 5 is a flowchart of an exemplary method of operating a wireless communications device in accordance with an exemplary embodiment.

FIG. 5 is a flowchart 500 of an exemplary method of operating a first wireless communications device in accordance with an exemplary embodiment. The first wireless communications device is, e.g., one of the wireless communications devices of system 100 of FIG. 1. Operation starts in step 502, where the first wireless communications device is powered on and initialized. Operation proceeds from step 502 to step 504. In step 504 the first communications device determines a number of devices using a technology on a channel, e.g., for each different channel and technology combination. In some embodiments, the determined number of devices using a technology on a channel is based on observed signals. Operation proceeds from step 504 to step 506.

In step 506 the first wireless communications device generates N×M latency estimates, each one of the N×M latency estimates corresponding to a different channel and technology combination, N being a positive integer corresponding to a number of available channels and M being a positive integer corresponding to a number of supported technologies. In some embodiments step 506 includes step 508. In step 508 the first wireless communications device determines a channel and technology latency estimate for an individual channel and technology combination based on an observed channel free time and an observed latency for the technology on the channel. In various embodiments step 508 is performed multiple times, e.g., one time for each channel and technology combination.

In some embodiments, step 508 includes one or more of steps 510 and 516. In step 510 the first wireless communications device bases the channel and technology latency estimate for the individual channel and technology combination also on the number of devices using the technology on the channel. Thus in some embodiments, the determined channel and technology latency estimate of step 508 is also based on the number of devices using the technology on the channel, e.g., obtained from step 504. In step 516 the first wireless communications device uses one of a latency estimate based on observed channel free time and a latency estimate based on observed latency for the technology on the channel. In some embodiments, in step 516 using one of a latency estimate based on observed channel free time and a latency estimate based on observed latency for the technology on the channel includes selecting one of a latency estimate based on observed channel free time and a latency estimate based on observed latency for the technology on the channel. In some embodiments, in step 516, the first wireless communications device selects the minimum of the latency estimate based on observed channel free time and the latency estimate based on observed latency. Operation proceeds from step 506 to step 518.

In step 518 the first wireless communications device receives channel and technology latency estimates determined by a second wireless communications device. Operation proceeds from step 518 to step 520. In step 520 the first wireless communications device selects a channel and technology combination based on the N×M latency estimates. In some embodiments, step 520 may, and sometimes does, includes step 522 in which the first wireless communications device performs said selecting as a function of the generated N×M latency estimates and said received channel and technology latency estimates. Operation proceeds from step 520 to step 524.

In step 524 the first wireless communications device uses the selected channel and technology combination for communication. Operation proceeds from step 524 to the input of step 504.

Steps 504, 508, 510, 516, 518 and 522 are optional steps, included in some embodiments and omitted in other embodiments. The exemplary flow of flowchart 500 has been described for an embodiment in which each of the steps are included. In an embodiment, where an optional step is omitted the optional step is bypassed in the operation flow.

Figure 9:
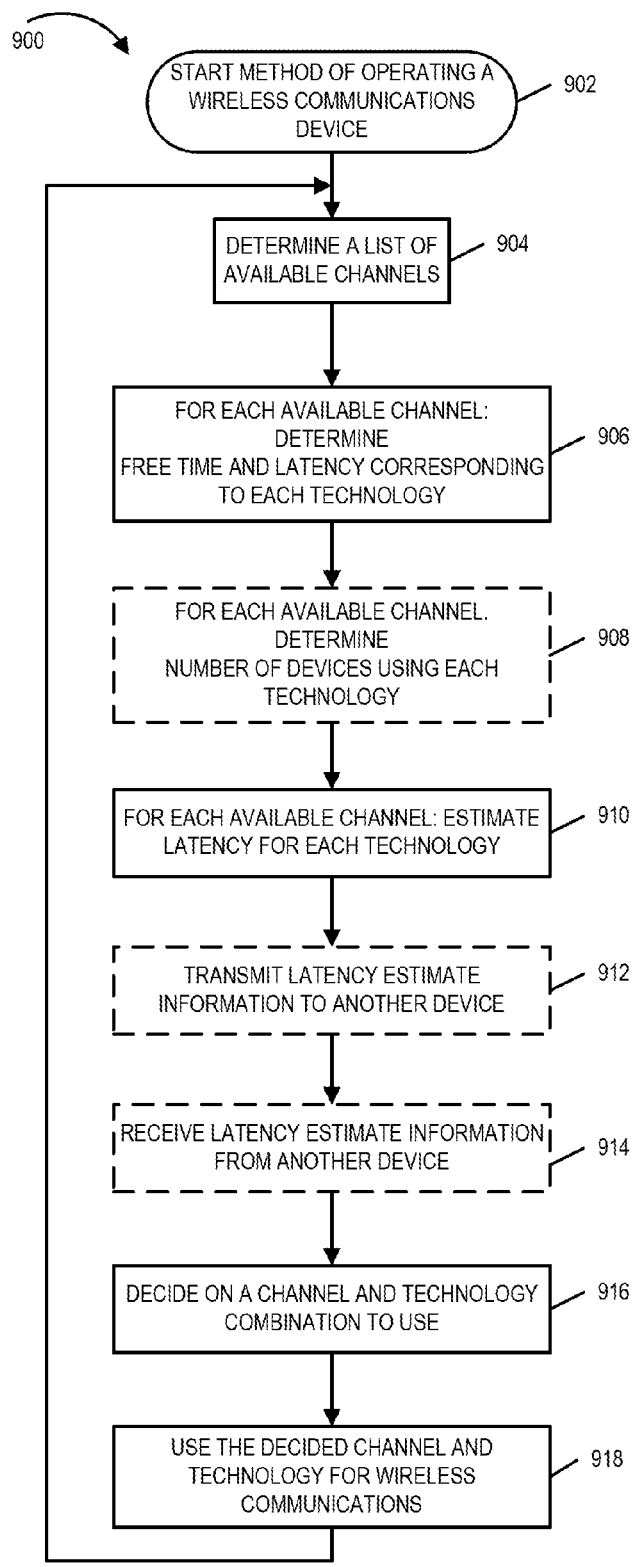
FIG. 9 is a flowchart of an exemplary method of operating a wireless communications device in accordance with various exemplary embodiments.

In some embodiments the N×M latency estimates are determined in accordance with methods and/or formulas described with respect to FIG. 9.

Figure 6:
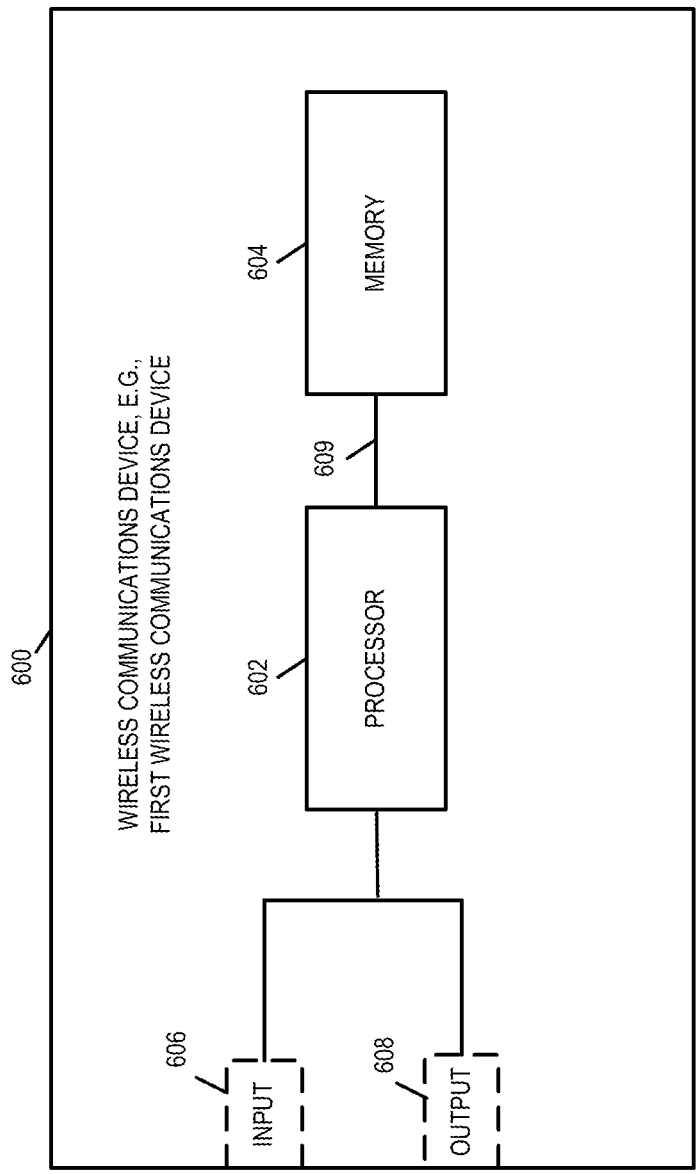
FIG. 6 is an exemplary wireless communications device in accordance with an exemplary embodiment.

FIG. 6 is a drawing of an exemplary wireless communications device 600, e.g., a first communications device, in accordance with an exemplary embodiment. Exemplary wireless communications device 600 is, e.g., one of the wireless communications devices of FIG. 1. Exemplary first wireless communications device 600 may, and sometimes does, implement a method in accordance with flowchart 500 of FIG. 5.

Wireless communications device 600 includes a processor 602 and memory 604 coupled together via a bus 609 over which the various elements (602, 604) may interchange data and information. Wireless communications device 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602 is configured to: generate N×M latency estimates, each one of the N×M latency estimates corresponding to a different channel and technology combination, N being a positive integer corresponding to a number of available channels, M being a positive integer corresponding to a number of supported technologies, and select a channel and technology combination based on the N×M latency estimates. Processor 602 is further configured to use the selected channel and technology combination for communication.

In some embodiments, processor 602 is configured to determine a channel and technology latency estimate for an individual channel and technology combination based on observed channel free time and an observed latency for the technology on the channel, as part of being configured to generating N×M latency estimates. In some such embodiments, processor 602 is configured to use the minimum one of (i) the channel and technology latency estimate for an individual channel and technology combination based on observed channel free time and (ii) an observed latency for the technology on the channel. In embodiments, processor 602 is configured to select the minimum one of (i) the channel and technology latency estimate for an individual channel and technology combination based on observed channel free time and (ii) an observed latency for the technology on the channel.

In various embodiments, processor 602 is configured to: determine a number of devices using the technology on the channel and base the channel and technology latency estimate for the individual channel and technology combination on the number of devices using the technology on the channel, as part of being configured to determine a channel and technology latency estimate. In some embodiments, processor 602 is configured determine the number of devices using a technology on channel based on observed signals.

In some embodiments, processor 602 is configured to use one of a latency estimate based on observed channel free time and a latency estimate based on observed latency for the technology on the channel, as part of being configured to determine a channel and technology latency estimate. In some embodiments, processor 602 is configured to select one of a latency estimate based on observed channel free time and a latency estimate based on observed latency for the technology on the channel, as part of being configured to determine a channel and technology latency estimate. In some such embodiments, processor 602 is configured to select the minimum one of (i) the channel and technology latency estimate for an individual channel and technology combination based on observed channel free time and (ii) an observed latency for the technology on the channel.

In various embodiments, processor 602 is configured to: receive channel and technology latency estimates determined by a second wireless communications device; and processor 602 is configured to perform said selecting of a channel and technology combination as a function of the generated N×M latency estimates and said received channel and technology latency estimates, as part of being configured to select a channel and technology combination.

Figure 7:
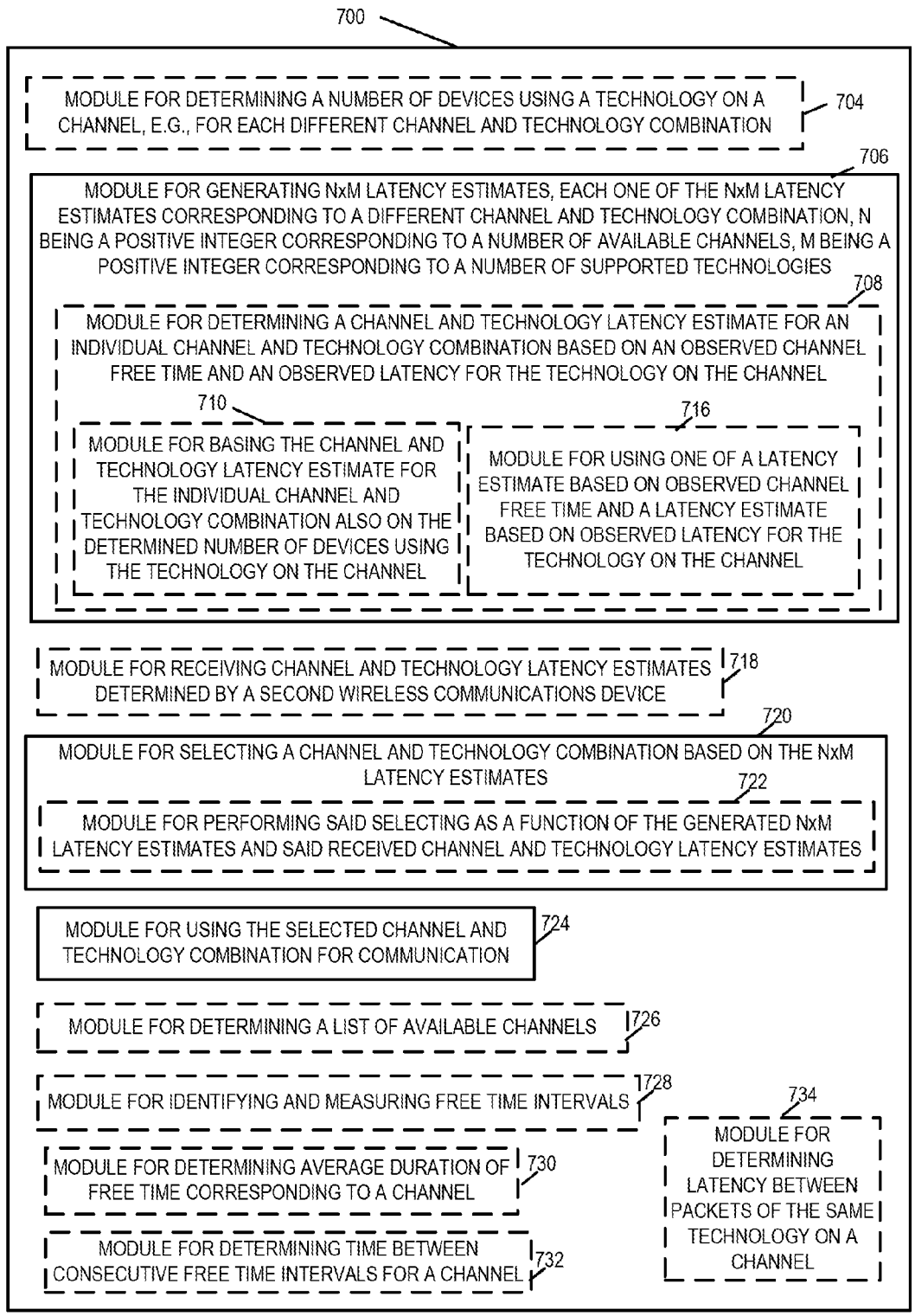
FIG. 7 is an assembly of modules which may be used in the exemplary wireless communications device of FIG. 6.

FIG. 7 is an assembly of modules 700 which can, and in some embodiments is, used in the wireless communications device 600 illustrated in FIG. 6. The modules in the assembly 700 can be implemented in hardware within the processor 602 of FIG. 6, e.g., as individual circuits. Alternatively, the modules may be implemented in software and stored in the memory 604 of the wireless communications device 600 shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In some embodiments, processor 602 is configured to implement each of the modules of the assembly of modules 700. In embodiments where the assembly of modules 700 is stored in the memory 604, the memory 604 is a computer program product comprising a computer readable medium, e.g., a non-transitory computer readable medium, comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the wireless communications device 600 or elements therein such as the processor 602, to perform the functions of the corresponding steps illustrated and/or described in the method of flowchart 500 of FIG. 5.

Assembly of modules 700 includes a module 706 for generating N×M latency estimates, each one of the N×M latency estimates corresponding to a different channel and technology combination, N being a positive integer corresponding to a number of available channels, M being a positive integer corresponding to a number of supported technologies, a module 720 for selecting a channel and technology combination based on the N×M latency estimates, and a module 724 for using the selected channel and technology combination for communication. In some embodiments, assembly of modules 700 further includes one or more of: a module 704 for determining a number of devices using a technology on a channel, e.g., for each different channel and technology combination, and a module 718 for receiving channel and technology latency estimates determined by a second wireless communications device. In some embodiments, module 706 for determining the number of devices using a technology on a channel bases its determination on observed signals.

In some embodiments, module 706 for generating N×M latency estimates includes a module 708 for determining a channel and technology latency estimate for an individual channel and technology combination based on an observed channel free time and an observed latency for the technology on the channel. In various embodiments, module 708 includes one or more or all of: a module 710 for basing the channel and technology latency estimate for the individual channel and technology combination also on the number of devices using the technology on the channel and a module 716 for using one of a latency estimate based on observed channel free time and a latency estimate based on observed latency for the technology on the channel. In some embodiments, module 716 selects one of a latency estimate based on observed channel free time and a latency estimate based on observed latency for the technology on the channel. In some embodiments, including module 716, module 716 selects the minimum one of the latency estimate based on observed channel free time and the latency estimate based on observed latency for the technology on the channel. In some embodiments, e.g., some embodiments, including module 718, the module 720 for selecting a channel and technology combination includes a module 722 for performing said selecting as a function of the generated N×M latency estimates from module 706 and said received channel and technology latency estimates from module 718.

In some embodiments assembly of module 700 further includes one or more or all of: a module 726 for determining a list of available channels, e.g., a list of N available channels, a module 728 for identifying and measuring free time intervals, a module 730 for determining average duration of free time corresponding to a channel, a module 732 for determining time between consecutive free time intervals for a channel, and an module 734 for determining latency between packets of the same technology on a channel.

FIG. 8 is a flowchart 800 of an exemplary method of operating a wireless communications device in accordance with various exemplary embodiments. The wireless communications device is, e.g., one of the wireless communications devices of system 100 of FIG. 1. The wireless communications device is, e.g., a mobile wireless terminal, such as a handheld mobile node, supporting a plurality of different peer to peer communications technologies. For example, the wireless communications device, in some embodiments, supports WiFi, 3G and Blue Tooth.

Operation starts in step 802, where the wireless communications device is powered on and initialized and proceeds to step 804. In step 804 the wireless communications device determines a list of available channels, e.g., a list of N channels where N is a positive integer. In some embodiments, the list of available channels is a list of white space TV spectrum channels which are available for peer to peer communications. In some such embodiments, at different locations and/or at different times, different channels may be available. In some embodiments, a single available channel is a 6 MHz frequency band. The determination of step 804, in some embodiments, includes one or more or all of: determining a current location of the communications device, communicating a determined current location to another node, receiving channel availability from another node, accessing stored channel availability information, and performing a channel sensing operation. Operation proceeds from step 804 to step 806.

In step 806, the wireless communications device determines, for each available channel, free time and channel usage corresponding to each technology. There are, e.g., M different supported technologies being considered, where M is a positive integer. In some embodiments, operation proceeds from step 806 to optional step 808, while, in other embodiments, operation proceeds from step 806 to step 810.

In step 808 the wireless communications device determines, for each available channel, a number of devices using each technology. Operation proceeds from step 808 to step 810. In step 810 the wireless communications device estimates, for each available channel, rate for each technology. In various embodiments, an individual rate estimate of step 810 is an estimate of the rate that the wireless communications device is expected to get if it uses a particular channel/technology combination.

In some embodiments, operation proceeds from step 810 to one of steps 812, 814, and 816. Steps 812 and 814 are optional steps, and one or both of steps 812 and 814 may be included in some embodiments.

In step 812 the wireless communications transmits rate estimate information to another device, e.g., transmits at least some of the information from step 810 to another wireless communications device, e.g., to a peer communications device in a local peer to peer network. In step 814 the wireless communications device receives rate estimation information from another device, e.g., receives rate estimation information determined by the another wireless communications device, e.g., a peer to peer communications device in a local peer to peer network. Thus via step 812 and/or step 814 rate information is exchanged between two wireless communications devices. Operation proceeds from step 814 to step 816.

In step 816 the wireless communications device decides on a channel and technology combination to use. The decision is based on rate estimation information from step 810. In some embodiments, the decision is also based on received rate estimation information from step 814. Operation proceeds from step 816 to step 818. In step 818 the wireless communications device uses the decided channel and technology combination from step 816, for wireless communications.

Consider one example in which the wireless communications device determines, e.g., in step 804, that there are two available channels, channel 1 and channel 2, and there are two technologies to consider, 3G and WiFi.

Consider that free time for channel 1 is represented by $F_1$ and free time for channel 2 is represented by $F_2$. In some embodiments, the wireless communications device measures detected energy on a channel and if the detected energy is below a threshold, e.g., a predetermined threshold, it is considered free time. Thus in some embodiments, the wireless communications device measured detected energy and makes a threshold comparison to determine free time in step 806.

The wireless communications device determines time used associated with the different technologies for each of the different channels, e.g., channel usage of step 806. In some such embodiments, the wireless communications device looks at the formats of detected packets being communicated, e.g., to distinguish between 3G usage and WiFi usage. Consider that $W_1$=channel 1 WiFi time, that $G_1$=channel 1 3G time, $W_2$=channel 2 WiFi time and that $G_2$=channel 2 3G time.

In some embodiments, the wireless communication determines, e.g., in step 808, the number of devices using a particular technology on a particular channel, e.g., by accessing information in packet headers, e.g., channel header addresses. Consider that $N_{W1}$=number of devices using WiFi on channel 1, $N_{G1}$=number of devices using 3G on channel 1, $N_{W2}$=number of devices using WiFi on channel 2, and $N_{G2}$=number of devices using 3G on channel 2.

The wireless communications device estimates the amount of time that the wireless communications device is expected to get access, for each channel/technology combination, if it decides to use that channel technology combination. For example, in one embodiment expected access time for the channel 1 WiFi technology combination is $AT_{W1}$=max $(F_1, W_1/(N_{W1}+1))$; expected access time for the channel 1 3G technology combination is $AT_{G1}$=max $(F_1, G_1/(N_{G1}+1))$; expected access time for the channel 2 WiFi technology combination is $AT_{W2}=\max(F_2, W_2/(N_{W2}+1))$; expected access time for the channel 2 3G technology combination is $AT_{G2}=\max(F_2, G_2/(N_{G2}+1))$.

The wireless communications device estimates, e.g., in step 808, an expected rate that the wireless communications device is expected to get for each of the channel technology combinations. For example, an individual rate for a channel and technology combination is determined as a function of an estimated amount of time that the wireless communications device is expected to get access on that channel technology combination. In one embodiment, expected rate for the channel 1 WiFi technology combination is $R_{W1}=(\max(F_1, W_1/(N_{W1}+1)))\times EBR_{W1}$; expected rate for the channel 1 3G technology combination is $R_{G1}=(\max(F_1, G_1/(N_{G1}+1)))\times EBR_{G1}$; expected rate for the channel 2 WiFi technology combination is $R_{W2}=(\max(F_2, W_2/(N_{W2}+1)))\times EBR_{W2}$; expected rate for the channel 2 3G technology combination is $R_{G2}=(\max(F_2, G_2/(N_{G2}+1)))\times EBR_{G2}$. $EBR_{W1}$ is an expected transmitted bit rate corresponding to the channel 1 WiFi technology combination; $EBR_{G1}$ is an expected transmitted bit rate corresponding to the channel 1 3G technology combination; $EBR_{W2}$ is an expected transmitted bit rate corresponding to the channel 2 WiFi technology combination; $EBR_{G2}$ is an expected transmitted bit rate corresponding to the channel 2 3G technology combination. In some embodiments, the expected transmitted bit rates, $EBR_{W1}$, $EBR_{G1}$, $EBR_{W2}$, and $EBR_{G2}$, are peak rates which are predetermined fixed numbers. In some such embodiments $EBR_{W1}=EBR_{W2}$ and $EBR_{G1}=EBR_{G2}$.

In some other embodiments, the expected transmitted bit rates, $EBR_{W1}$, $EBR_{G1}$, $EBR_{W2}$, and $EBR_{G2}$, are predicted transmitted bit rates. In some such embodiments the predicated transmitted bit rates are a function of measured average interference level information and/or channel loss information, e.g., based on SNR measurement information.

In some embodiments, the number of devices using a channel and technology combination is not available to the wireless communications device and/or not tracked by the wireless communications device. In some such embodiments, the wireless communications device estimates rates without using $N_{W1}$, $N_{W2}$, $N_{G1}$ and $N_{G2}$. For example, in one such embodiment, expected rate for the channel 1 WiFi technology combination is $R_{W1}=(\max(F_1, W_1))\times EBR_{W1}$; expected rate for the channel 1 3G technology combination is $R_{G1}=(\max(F_1, G_1))\times EBR_{G1}$; expected rate for the channel 2 WiFi technology combination is $R_{W2}=(\max(F_2, W_2))\times EBR_{W2}$; expected rate for the channel 2 3G technology combination is $R_{G2}=(\max(F_2, G_2))\times EBR_{G2}$. In another such embodiment, expected rate for the channel 1 WiFi technology combination is $R_{W1}=W_1\times EBR_{W1}$; expected rate for the channel 1 3G technology combination is $R_{G1}=G_1\times EBR_{G1}$; expected rate for the channel 2 WiFi technology combination is $R_{W2}=W_2\times EBR_{W2}$; expected rate for the channel 2 3G technology combination is $R_{G2}=G_2\times EBR_{G2}$.

In some embodiments, the wireless communications device decides, e.g., in step 816, on a channel and technology combination to use as a function of the estimated rate estimates $R_{W1}$, $R_{G1}$, $R_{W2}$, $R_{G2}$, e.g., selecting the one corresponding to the highest value. In various embodiments, the wireless communications devices also receives rate information corresponding to channel and technology combinations from another device, and also uses that information in selecting a channel and technology combination, e.g., choosing a channel and technology combination that is best suited for the two devices, e.g., selecting the channel and technology combination that gives a combined best rate from the perspective of the two devices.

The wireless communications device uses the decided channel and technology combination, e.g., of step 816, in step 818 for wireless communications, e.g., for direct peer to peer communications as part of a local peer to peer communications network. In some embodiments, one or more of steps 806 and 808 are included as part of step 810.

FIG. 9 is a flowchart 900 of an exemplary method of operating a wireless communications device in accordance with various exemplary embodiments. The wireless communications device is, e.g., one of the wireless communications devices of system 100 of FIG. 1. The wireless communications device is, e.g., a mobile wireless terminal, such as a handheld mobile node, supporting a plurality of different peer to peer communications protocols. For example, the wireless communications device, in some embodiments, supports WiFi, 3G and Blue Tooth.

Operation starts in step 902, where the wireless communications device is powered on and initialized and proceeds to step 904. In step 904 the wireless terminal determines a list of available channels, e.g., a list of N channels where N is a positive integer. In some embodiments, the list of available channels is a list of white space TV spectrum channels which are available for peer to peer communications. In some such embodiments, at different locations and/or at different times, different channels may be available. In some embodiments, a single available channel is a 6 MHz frequency band. The determination of step 904, in some embodiments, includes one or more or all of: determining a current location of the communications device, communicating a determined current location to another node, receiving channel availability from another node, accessing stored channel availability information, and performing a channel sensing operation. Operation proceeds from step 904 to step 906.

In step 906, the wireless communications device determines, for each available channel, free time and latency corresponding to each technology. There are, e.g., M different supported technologies being considered, where M is a positive integer. In some embodiments, operation proceeds from step 906 to optional step 908, while, in other embodiments, operation proceeds from step 906 to step 910.

In step 908 the wireless communications device determines, for each available channel, a number of devices using each technology. Operation proceeds from step 908 to step 910. In step 910 the wireless communications device estimates, for each available channel, latency for each technology.

In some embodiments, operation proceeds from step 910 to one of steps 912, 914, and 916. Steps 912 and 914 are optional steps, and one or both of steps 912 and 914 may be included in some embodiments.

In step 912 the wireless communications transmits latency estimate information to another device, e.g., transmits at least some of the information from step 910 to another wireless communications device, e.g., to a peer communications device in a local peer to peer network. In step 914 the wireless communications device receives latency estimate information from another device, e.g., receives latency estimate information determined by the another wireless communications device, e.g., a peer to peer communications device in a local peer to peer network. Thus via step 912 and/or step 914 latency information is exchanged between two wireless communications devices. Operation proceeds from step 914 to step 916.

In step 916 the wireless communications device decides on a channel and technology combination to use. The decision is based on estimated latency information from step 910. In some embodiments, the decision is also based on received latency information from step 914. Operation proceeds from step 916 to step 918.

In step 918 the wireless communications device uses the decided channel and technology combination from step 916, for wireless communications.

Consider one example in which the wireless communications device determines, e.g., in step 904 that there are two available channels, channel 1 and channel 2, and that there are two technologies to consider, 3G and WiFi.

Consider that average duration of free time for channel 1 is represented by $F_1$ and average duration of free time for channel 2 is represented by $F_2$. Further consider that time between two consecutive free time intervals for channel 1 is represented by $L_{1f}$ and time between two consecutive free time intervals for channel 2 is represented by $L_{2f}$. In some embodiments, the wireless communications device measures detected energy on a channel and if the detected energy is below a threshold, e.g., a predetermined threshold, it is considered free time. Thus in some embodiments, the wireless communications device measures detected energy and makes a threshold comparison to determine free time information, e.g., $F_1$, $F_2$, $L_{1f}$ and $L_{2f}$ in step 906.

The wireless communications device also determines latency corresponding to the different technologies for each of the different channels in step 906. In some such embodiments, the wireless communications device looks at the formats of detected packets being communicated, e.g., to distinguish between 3G usage and WiFi usage. Consider that $L_{1W}$=time between WiFi packets on channel 1; that $L_{1G}$=time between 3G packets on channel 1; that $L_{2W}$=time between WiFi packets on channel 2; that $L_{2G}$=time between 3G packets on channel 2. In various embodiments, the source of the packets is not of interest when determining $L_{1W}$, $L_{1G}$, $L_{2W}$, $L_{2G}$; however, the technology associated with the packet and the channel is of interest. Thus, e.g., any detected WiFi packets on channel 1 are used in determining $L_{1W}$.

In some embodiments, the wireless communication determines, e.g., in step 908, the number of devices using a particular technology on a particular channel, e.g., by accessing information in packet headers, e.g., channel header addresses. Consider that $N_{W1}$=number of devices using WiFi on channel 1, $N_{1G}$=number of devices using 3G on channel 1, $N_{W2}$=number of devices using WiFi on channel 2, and $N_{G2}$=number of devices using 3G on channel 2.

The wireless communications device estimates, in step 910, a device latency value for each channel/technology combination. For example, in one embodiment expected device latency for the channel 1 WiFi technology combination is $L_{DW1}$=Min $(L_{1W}(N_{W1}+1), L_{1f}^2/(2(F_1+L_{1f})))$; expected device latency for the channel 1 3G technology combination is $L_{DG1}$=Min $(L_{1G}(N_{G1}+1), L_{1f}^2/(2(F_1+L_{1f})))$; expected device latency for the channel 2 WiFi technology combination is $L_{DW2}$=Min $(L_{2W}(N_{W2}+1), L_{1f}^2/(2(F_2+L_{2f})))$; expected device latency for the channel 2 3G technology combination is $L_{DG2}$=min $(L_{2G}(N_{G2}+1), L_{2f}^2/(2(F_2+L_{2f})))$. In this example, for each device latency value, one of (i) a latency estimate based on observed latency for the technology on the channel and (ii) a latency estimate based on observed channel free time is selected, e.g., the minimum of the two is selected.

In various embodiments in which optional step 908 is not included, the device latency values are determined as a function of the observed latency for the technology on the channel. For example, $L_{Dw1}=L_{1f}^2/(2(F_1+L_{1f})$; expected device latency for the channel 1 3G technology combination is $L_{DG1}=L_{1f}^2/(2(F_1+L_{1f}))$; expected device latency for the channel 2 WiFi technology combination is $L_{DW2}=L_{1f}^2/(2(F_2+L_{2f}))$; expected device latency for the channel 2 3G technology combination is $L_{DG2}=L_{2f}^2/(2(F_2+L_{2f}))$.

In another embodiment, in which optional step 908 is not included, expected device latency for the channel 1 WiFi technology combination is $L_{DW1}$=min $(L_{1W}, L_{1f}^2/(2(F_1+L_{1f})))$; expected device latency for the channel 1 3G technology combination is $L_{DG1}$=Min $(L_{1G}, L_{1f}^2/(2(F_1+L_{1f})))$; expected device latency for the channel 2 WiFi technology combination is $L_{DW2}$=Min $(L_{2W}, L_{1f}^2/(2(F_2+L_{2f})))$; expected device latency for the channel 2 3G technology combination is $L_{DG2}$=min $(L_{2G}, L_{2f}^2/(2(F_2+L_{2f})))$.

In still another embodiment, in which optional step 908 is not included, expected device latency for the channel 1 WiFi technology combination is $L_{DW1}=L_{1W}$; expected device latency for the channel 1 3G technology combination is $L_{DG1}=L_{1G}$; expected device latency for the channel 2 WiFi technology combination is $L_{DW2}=L_{2W}$; expected device latency for the channel 2 3G technology combination is $L_{DG2}=L_{2G}$.

In some embodiments, the wireless communications device decides, e.g., in step 916, on a channel and technology combination to use as a function of the latency $L_{DW1}$, $L_{DG1}$, $L_{DW2}$, $L_{DG2}$, e.g., selecting the one corresponding to the lowest value. In various embodiments, the wireless communications devices also receives latency information corresponding to channel and technology combinations from another device, and also uses that information in selecting a channel and technology combination, e.g., choosing a channel and technology combination that is best suited for the two devices, e.g., achieves an average minimum latency for the two devices.

The wireless communications device uses the decided, e.g., selected, channel and technology combination, e.g., of step 916, in step 918 for wireless communications, e.g., for direct peer to peer communications as part of a local peer to peer communications network. In some embodiments, one or more of steps 906 and 908 are included as part of step 910.

Figure 10:
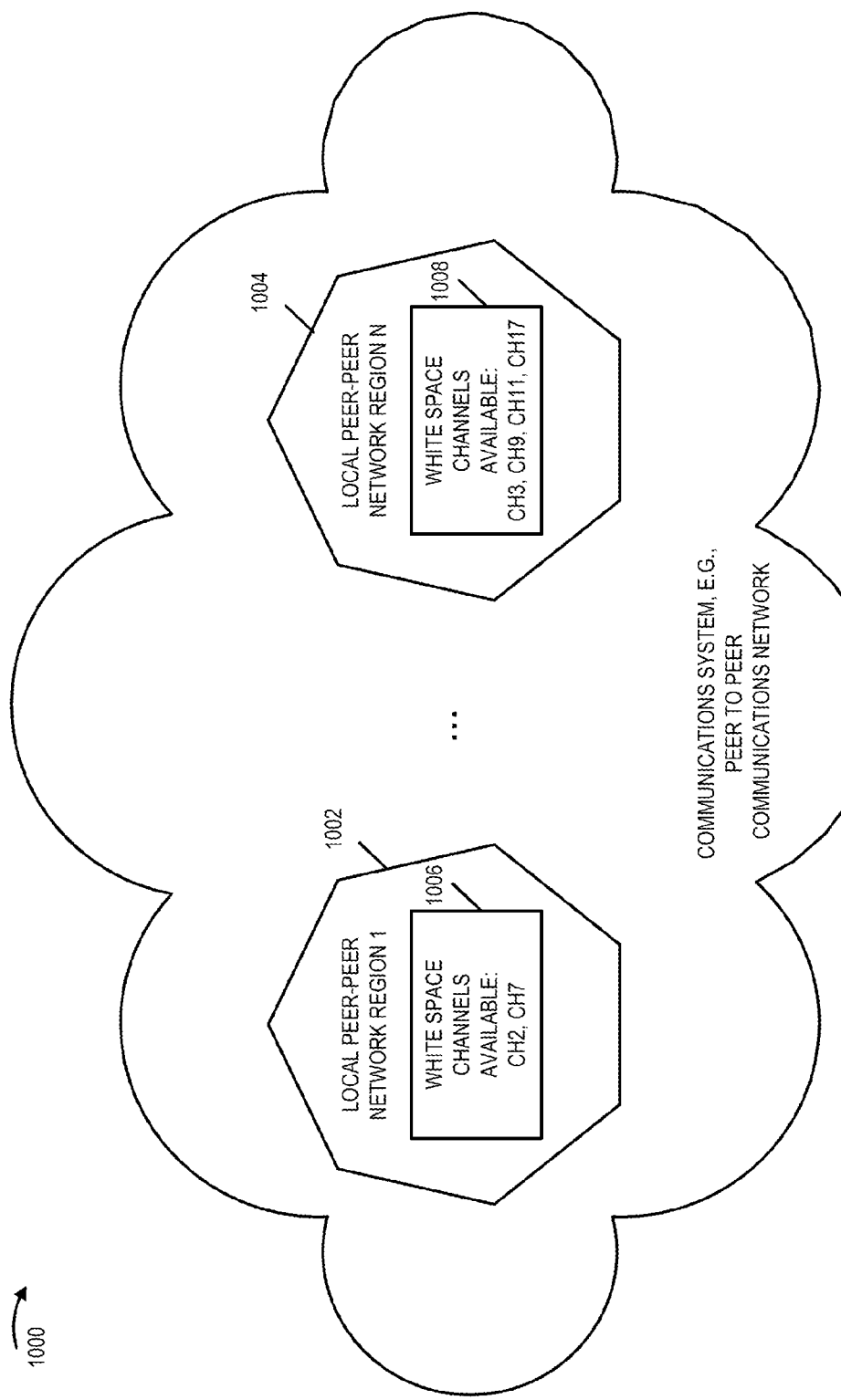
FIG. 10 is a drawing of an exemplary communications system in accordance with an exemplary embodiment in which different white space channels are available in different local regions.

FIG. 10 is a drawing of an exemplary communications system 1000 in accordance with an exemplary embodiment. Exemplary communications system 1000 is, e.g., exemplary communications system 100 of FIG. 1. Exemplary communications system 1000 includes a plurality of local peer to peer network regions (local peer to peer network region 1 1002, . . . , local peer to peer network region N 1004). White space channels, e.g., unused TV channels, are available for wireless communications, e.g., peer to peer wireless communications. In different regions, different white space channels may be available for communications. In this example, in local peer to peer network region 1 1002 white space channels Ch 2 and Ch 7 are available for use for peer to peer communications as indicated by box 1006, and in local peer to peer network region N 1004 white space channels Ch 3, Ch 9, Ch11 and Ch 17 are available for use for peer to peer communications, as indicated by box 1008.

Figure 11:
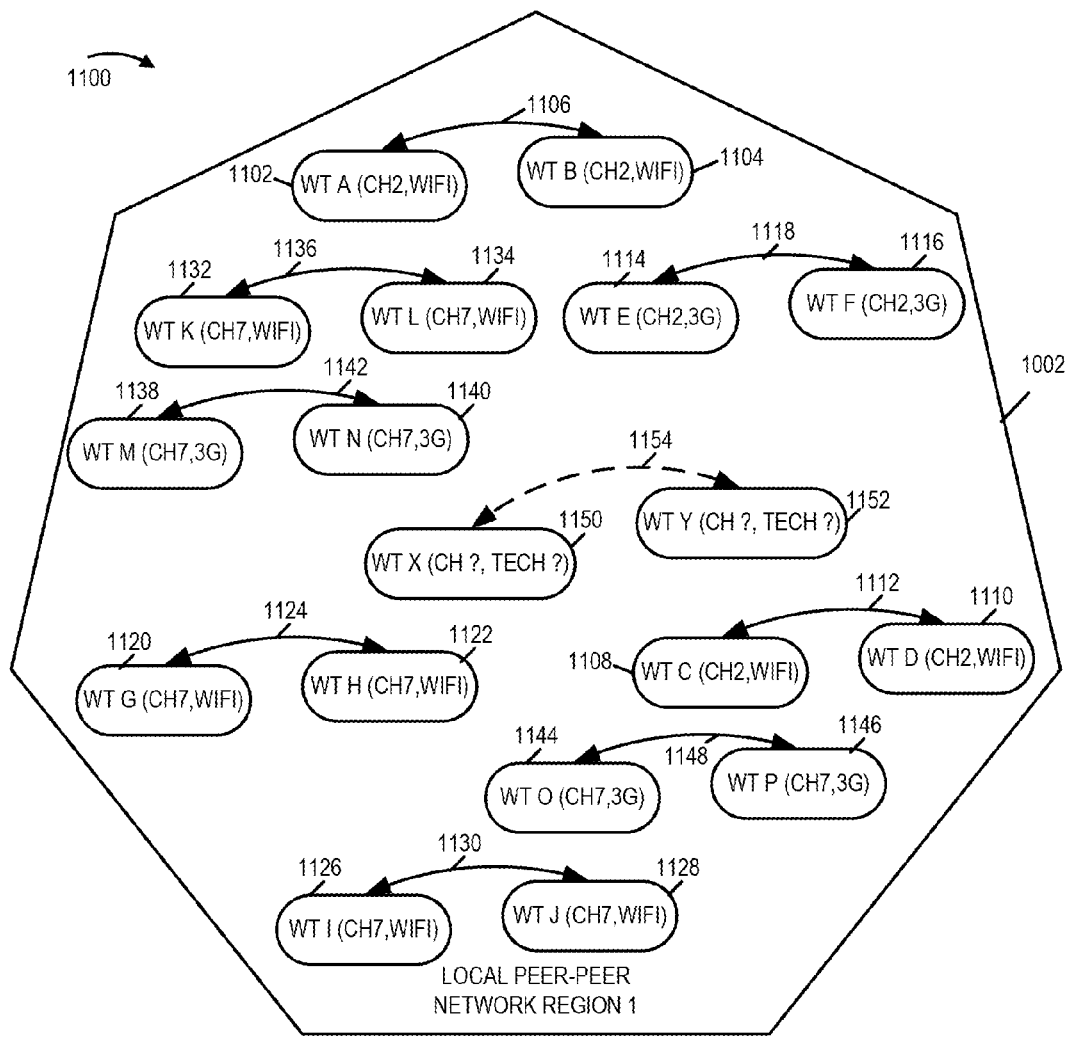
FIG. 11 is a drawing illustrating an example in which different channels and different technologies are in use in a local region for peer to peer communications, and a wireless terminal selects a channel and technology combination to use.

FIG. 11 is a drawing 1100 illustrating an example in which different channels and different technologies are in use in a local region for peer to peer communications, and a wireless terminal selects a channel and technology combination to use. In this example, within local peer to peer region 1 1002 there are two channels being used, Ch 2 and Ch 7, and two technologies are being used, WiFi and 3G. WT A 1102 and WT B 1104 have a peer to peer communications link 1106 and are using the channel 2/WiFi technology combination. WT C 1108 and WT D 1110 have a peer to peer communications link 1112 and are using the channel 2/WiFi technology combination. WT E 1114 and WT F 1116 have a peer to peer communications link 1118 and are using the channel 2/3G technology combination. WT G 1120 and WT H 1122 have a peer to peer communications link 1124 and are using the channel 7/WiFi technology combination. WT I 1126 and WT J 1128 have a peer to peer communications link 1130 and are using the channel 7/WiFi technology combination. WT K 1132 and WT L 1134 have a peer to peer communications link 1136 and are using the channel 7/WiFi technology combination. WT M 1138 and WT N 1140 have a peer to peer communications link 1142 and are using the channel 7/3G technology combination. WT O 1144 and WT P 1146 have a peer to peer communications link 1148 and are using the channel 7/3G technology combination.

WT X 1150 would like to establish link 1154 with WT Y 1152 so that it can transmit peer to peer data to WT Y 1152 including peer to peer traffic data. Wireless terminal X 1150 and WT Y 1152 monitor the signaling activity from the other wireless communications devices in local peer to peer network region 1 1002. Wireless terminal X 1150 selects a channel and technology combination to use, e.g., in accordance with an exemplary method described with respect to FIG. 2, FIG. 5, FIG. 8 and/or FIG. 9. Then wireless terminals (WT X 1150 and WT Y 1152) communicate over wireless communication link 1154 using the selected channel and technology combination to communicate direct peer to peer signals. In some embodiments, the selection of the channel and technology combination is to maximize communications data rates. In some embodiments, the selection of the channel and technology combination is to minimize latency.

Various aspects and/or features or some, but not necessarily all, embodiments will be described below. Suppose a wireless communications device, e.g., a mobile wireless terminal supporting a plurality of alternative peer to peer technologies, corresponding to a link with another wireless communications device has N whitespace channels potentially available for use at its particular present location. The wireless communications device decides, e.g., selects, which one of the N channels that it should use, and also what technology to use on that channel. For example, consider that there are two dominant technologies 3G, and WiFi operating on the white space. Then, on each of the channels the wireless communications devices makes an assessment of the rate that it will get for the link if it were to use that channel using either WiFi or 3G technologies. In some embodiments the assessment depends on one or more or all of the following parameters:

Amount of free time (unused) on the channel,
Number of 3G links operating on that channel, and
Number of WiFi links that are operating on that channel;
and the wireless communications device determines one or more of all of the parameters and performs its assessment and channel/technology combination selection as a function of the determined parameters. In some embodiments, the wireless communications device selects the channel and a technology combination that gives the maximum possible rate from among the alternatives. In some embodiments, the wireless communications device selects the channel and a technology combination that minimizes average latency.

Two exemplary methods for selecting a channel/technology combination to communicate on, e.g., for peer to peer communications, are described below. One method tends to maximize average rate and one method tends to minimize average latency. The method used by a particular device, in some embodiments, depends on the application requirement.

An exemplary method for maximizing rate will now be described. Consider there are N whitespace channels available for use. Each device, for each channel measures:

F: Free time: amount of time/sec the channel is unused (i.e. energy<threshold)
W: WiFi time: amount of time/sec the channel is used for WiFi by other devices
N_W: number of WiFi transmitters using the channel.
G: 3G time: amount of time/sec the channel is used for 3G by other devices
N_G: number of 3G transmitters using the channel.
Then, the average rate prediction when using WiFi is given by: max(F, W/(N_W+1)).
Then, the average rate prediction when using 3G is given by: max(F, G/(N_G+1)).

The max is taken to account for two regimes: one when the channel is not loaded, in that case F is a good estimate of the rate. In the second regime, where channel is highly loaded (hence F is small), W/(N_W+1) is a better estimate of the rate. If N_W and N_G are not available, then W and G will be used as the estimates for rates.

Then, a wireless communications device which intends to transmit picks a channel and technology combination that maximizes the rate, which it would like to use. Rate estimation information and/or channel and technology selection information, determined by the wireless communications transmitter device, is shared with the intended receiver device through a sequence of message exchanges to converge on a technology and channel combination to use to maximize the joint communication rate from the perspective of both devices. In some embodiments, the message exchange occurs on one of the whitespace channels. In some other embodiments, the message exchange occurs on an auxiliary channel such as ISM band or a licensed band. Then the two devices communicate with one another using the selected channel and technology combination which has been agreed upon, e.g., for peer to peer signaling including direct peer to peer traffic signaling between the two devices.

In some such embodiments, the method further measure interference levels and/or also use spectral efficiencies of WiFi and 3G to optimize the channel and technology used.

An exemplary method for minimizing latency will now be described. Consider that there are N whitespace channels available for use. Each device, for each channel measures:

L_F: estimate of time duration between consecutive free time intervals. In some embodiments, L_F is defined to be zero if the channel is always free. In some embodiments, a interval is defined to be a free time interval if the interval is free for at least predetermined minimum time.
F: estimate of average burst of free time.
L_W: WiFi latency: average delay between two WiFi transmissions by other devices.
N_W: number of WiFi transmitters using the channel.
L_G: 3G latency: average delay between two 3G transmissions by other devices.
N_G: number of 3G transmitters using the channel.
Then, the latency prediction when using WiFi is given by:

min(L_F*L_F/(2*(F+L_F)),L_W*(N_W+1)).

Then, the latency prediction when using 3G is given by:

min(L_F*L_F/(2*(F+L_F)),L_G*(N_G+1)).

The min is taken to account for two regimes: one when the channel is not loaded ((hence L_F is small), in that case L_F*L_F/(2*(F+L_F)) is a good estimate for latency. The formula is obtained from a simple model in which the channel follows F duration of free time and L_F duration of occupied time. In the second regime, where channel is highly loaded (hence L_F is large), L_W* (N_W+1) is a better estimate of the latency. If N_W and N_G are not available, then L_W and L_G will be used as the estimates for latency.

Then, a wireless communications device which intends to transmit selects a channel and technology combination that minimizes latency as its preferred channel and technology combination. Latency estimates and/or channel and technology preference information, determined by the transmitter device, is shared with the intended receiver device through a sequence of message exchanges to converge on a technology and channel used to minimize joint communication latency. In some embodiments, the message exchange occurs on one of the whitespace channels. In some other embodiments, the message exchange occurs on an auxiliary channel such as ISM band or a licensed band. Then the two devices communicate with one another using the selected channel and technology combination which has been agreed upon, e.g., for peer to peer signaling including direct peer to peer traffic signaling between the two devices.

In various embodiments a communications device, e.g., communications device 300 of FIG. 3 or communications device of 600 of FIG. 6, includes a module corresponding to each of the individual steps and/or operations described with regard to any of the Figures in the present application and/or described in the detailed description of the present applications. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first wireless communications device, comprising:
generating N×M rate estimates, each one of the N×M rate estimates corresponding to a different channel and technology combination, N being a positive integer corresponding to a number of available channels, M being a positive integer corresponding to a number of supported technologies, M being greater than 1;
selecting a channel and technology combination based on the N×M rate estimates; and
using the selected channel and technology combination for communication.

2. The method of claim 1, wherein generating N×M rate estimates includes:
determining a channel and technology rate estimate for an individual channel and technology combination based on observed channel free time and an observed channel usage for the technology on the channel.

3. The method of claim 2, further comprising:
determining a number of devices using the technology on the channel; and
wherein said step of determining a channel and technology rate estimate is also based on the number of devices using the technology on the channel.

4. The method of claim 3, wherein the number of devices is based on observed signals; and
wherein determining the channel and technology rate estimate includes using one of a rate estimate based on observed channel free time and a rate estimate based on observed channel usage for the technology on the channel.

5. The method of claim 2, further comprising:
receiving channel and technology rate estimates determined by a second wireless communications device; and
wherein said selecting is performed as a function of the generated N×M rate estimates and said received channel and technology rate estimates.

6. A first wireless communications device, comprising:
means for generating N×M rate estimates, each one of the N×M rate estimates corresponding to a different channel and technology combination, N being a positive integer corresponding to a number of available channels, M being a positive integer corresponding to a number of supported technologies, M being greater than 1;
means for selecting a channel and technology combination based on the N×M rate estimates; and
means for using the selected channel and technology combination for communication.

7. The first wireless communications device of claim 6, wherein said means for generating N×M rate estimates includes:
means for determining a channel and technology rate estimate for an individual channel and technology combination based on observed channel free time and an observed channel usage for the technology on the channel.

8. The first wireless communications device of claim 7, further comprising:
means for determining a number of devices using the technology on the channel; and
wherein said means for determining a channel and technology rate estimate includes means for basing the channel and technology rate estimate for the individual channel and technology combination also on the number of devices using the technology on the channel.

9. The first wireless communications device of claim 8, wherein the number of devices is based on observed signals; and
wherein said means for determining the channel and technology rate estimate includes means for using one of a rate estimate based on observed channel free time and a rate estimate based on observed channel usage for the technology on the channel.

10. The first wireless communications device of claim 7, further comprising:
means for receiving channel and technology rate estimates determined by a second wireless communications device; and
wherein said means for selecting a channel and technology combination to be used includes means for performing said selecting as a function of the generated N×M rate estimates and said received channel and technology rate estimates.

11. A computer program product for use in a first wireless communications device, the computer program product comprising:
a non-transitory computer readable medium comprising:
code for causing at least one computer to generate N×M rate estimates, each one of the N×M rate estimates corresponding to a different channel and technology combination, N being a positive integer corresponding to a number of available channels, M being a positive integer corresponding to a number of supported technologies, M being greater than 1;
code for causing said at least one computer to select a channel and technology combination based on the N×M rate estimates; and
code for causing said at least one computer to use the selected channel and technology combination for communication.

12. A first wireless communications device comprising:
at least one processor configured to:
generate N×M rate estimates, each one of the N×M rate estimates corresponding to a different channel and technology combination, N being a positive integer corresponding to a number of available channels, M being a positive integer corresponding to a number of supported technologies, M being greater than 1;
select a channel and technology combination based on the N×M rate estimates; and
use the selected channel and technology combination for communication;
and memory coupled to said at least one processor.

13. The first wireless communications device of claim 12, wherein said least one processor is configured to:
determine a channel and technology rate estimate for an individual channel and technology combination based on observed channel free time and an observed channel usage for the technology on the channel, as part of being configured to generating N×M rate estimates.

14. The first wireless communications device of claim 13, wherein said at least one processor is further configured to:
determine a number of devices using the technology on the channel; and base the channel and technology estimate for the individual channel and technology combination on the number of devices using the technology on the channel, as part of being configured to determine a channel and technology rate estimate.

15. The wireless communications device of claim 14, wherein said number of devices is based on observed signals; and
wherein said at least one processor is configured to use one of a rate estimate based on observed channel free time and a rate estimate based on observed channel usage for the technology on the channel, as part of being configured to determine a channel and technology rate estimate.

16. A method of operating a first wireless communications device, comprising:
generating N×M latency estimates, each one of the N×M latency estimates corresponding to a different channel and technology combination, N being a positive integer corresponding to a number of available channels, M being a positive integer corresponding to a number of supported technologies, M being greater than 1; and
selecting a channel and technology combination based on the N×M latency estimates; and
using the selected channel and technology combination for communication.

17. The method of claim 16, wherein generating N×M latency estimates includes:
determining a channel and technology latency estimate for an individual channel and technology combination based on observed channel free time and an observed latency for the technology on the channel.

18. The method of claim 17, further comprising:
determining a number of devices using the technology on the channel; and
wherein said step of determining a channel and technology latency estimate is also based on the determined number of devices using the technology on the channel.

19. The method of claim 18, wherein said number of devices is based on observed signals; and
wherein determining the channel and technology latency estimate includes using one of a latency estimate based on observed channel free time and a latency estimate based on observed latency for the technology on the channel.

20. The method of claim 17, further comprising:
receiving channel and technology latency estimates determined by a second wireless communications device; and
wherein said selecting is performed as a function of the generated N×M latency estimates and said received channel and technology latency estimates.

21. A first wireless communications device, comprising:
means for generating N×M latency estimates, each one of the N×M latency estimates corresponding to a different channel and technology combination, N being a positive integer corresponding to a number of available channels, M being a positive integer corresponding to a number of supported technologies, M being greater than 1; and
means for selecting a channel and technology combination based on the N×M latency estimates; and
means for using the selected channel and technology combination for communication.

22. The first wireless communications device of claim 21, wherein said means for generating N×M latency estimates includes:
means for determining a channel and technology latency estimate for an individual channel and technology combination based on observed channel free time and an observed latency for the technology on the channel.

23. The first wireless communications device of claim 22, further comprising:
means for determining a number of devices using the technology on the channel; and
wherein said means for determining a channel and technology latency estimate includes means for basing the channel and technology latency estimate for the individual channel and technology combination also on the determined number of devices using the technology on the channel.

24. The first wireless communications device of claim 23, wherein said number of devices is based on observed signals; and
wherein said means for determining the channel and technology latency estimate includes means for using one of a latency estimate based on observed channel free time and a latency estimate based on observed latency for the technology on the channel.

25. The first wireless communications device of claim 22, further comprising:
means for receiving channel and technology latency estimates determined by a second wireless communications device; and
wherein said means for selecting a channel and technology combination includes means for performing said selecting as a function of the generated N×M latency estimates and said received channel and technology latency estimates.

26. A computer program product for use in a first wireless communications device, the computer program product comprising:
a non-transitory computer readable medium comprising:
code for causing at least one computer to generate N×M latency estimates, each one of the N×M latency estimates corresponding to a different channel and technology combination, N being a positive integer corresponding to a number of available channels, M being a positive integer corresponding to a number of supported technologies, M being greater than 1;
code for causing said at least one computer to select a channel and technology combination based on the N×M latency estimates; and
code for causing said at least one computer to use the selected channel and technology combination for communication.

27. A first wireless communications device comprising:
at least one processor configured to:
generate N×M latency estimates, each one of the N×M latency estimates corresponding to a different channel and technology combination, N being a positive integer corresponding to a number of available channels, M being a positive integer corresponding to a number of supported technologies, M being greater than 1;
select a channel and technology combination based on the N×M latency estimates; and
use the selected channel and technology combination for communication; and
memory coupled to said at least one processor.

28. The first wireless communications device of claim 27, wherein said at least one processor is configured to determine a channel and technology latency estimate for an individual channel and technology combination based on observed channel free time and an observed latency for the technology on the channel, as part of being configured to generate N×M latency estimates.

29. The first wireless communications device of claim 28, wherein said at least one process is further configured to:
  determine a number of devices using the technology on the channel; and
  wherein said at least one processor is configured to base the channel and technology latency estimate for the individual channel and technology combination also on the determined number of devices using the technology on the channel, as part of being configured to determine a channel and technology latency estimate.

30. The first wireless communications device of claim 29, wherein said number of devices is based on observed signals; and
  wherein said at least one processor is configured to use one of a latency estimate based on observed channel free time and a latency estimate based on observed latency for the technology on the channel, as part of being configured to determine the channel and technology latency estimate.

* * * * *